PEN POSITIONING CIRCUIT

Filed Nov. 30, 1961 5 Sheets-Sheet 1

William J. Muldoon,
*INVENTOR.*
*BY.*
Walter J. Adam
*ATTORNEY.*

William J. Muldoon,
*INVENTOR.*

BY.

*Walter J. Adam*
*ATTORNEY.*

William J. Muldoon,
INVENTOR.
BY.

Walter J. Adam
ATTORNEY.

William J. Muldoon,
INVENTOR.
BY.
Walter J. Adam
ATTORNEY.

William J. Muldoon,
INVENTOR.
BY.
Walter J. Adam
ATTORNEY.

United States Patent Office 3,127,678
Patented Apr. 7, 1964

3,127,678
PEN POSITIONING CIRCUIT

William J. Muldoon, Palos Verdes, Calif., assignor to Hughes Aircraft Company, Culver City, Calif., a corporation of Delaware Filed Nov. 30, 1961, Ser. No. 156,110
2 Claims. (Cl. 33—1)

This invention relates to circuits for positioning an object and particularly to a circuit for rapidly and precisely moving a pen to a command position on a plotting board.

Plotting board devices such as utilized in automatic drafting machines conventionally have a board over which a pen moving mechanism is provided responsive to control signals to draw desired lines. The control signals may be provided by suitable circuits in response to digital command signals, for example. One problem associated with the use of plotting boards for automatic drafting machines when operating at high speeds is to control the pen so as to rapidly and reliably move from one line starting position to another, as desired lines may start at a multiude of positions on the plotting board. Because the speed of slewing of a pen across the plotting board is not limited by such factors as the ability of the ink to flow from the pen, a high speed machine must provide rapid slewing from the end point of one line to the starting point of another. However, if the pen is moved from one position to another at a high speed, the momentum of the pen mechanism results in overshoots after the pen has reached a command position. If the pen is moved or dropped onto the drawing board before the overshoots are terminated, undesired lines are formed on the drawing paper. Thus, for high speed operation in an automatic drafting machine, an arrangement must be provided for rapidly slewing the pen to a command position while being held up from the board and for moving the pen down onto the board only when the overshoot transients are properly terminated.

It is therefore an object of this invention to provide a circuit for rapidly moving an object to a desired position on a surface.

It is another object of this invention to provide a pen control circuit for rapidly and precisely positioning a pen over a plotting board and for moving the pen onto the board at the proper time.

It is a further object of this invention to provide a pen control circuit for a plotting board that lifts the pen after completion of a line segment, rapidly slews the pen to a new command point and then automatically moves the pen onto the plotting board when overshoot transients have sufficiently terminated.

It is a still further object of this invention to provide a pen positioning circuit that rapidly moves a pen to a command position by controlling the servo-motors of a plotting mechanism and then responds to a monitored error position voltage of the servo-motors to move the pen onto the plotting board only after termination of overshoot motions such as those caused by inertia of the plotting mechanism.

Briefly, in accordance with this invention, a pen control circuit is provided for rapidly moving the pen mechanism of a plotting board to a command position which may be the starting point of a line to be drawn. The pen after being lifted from contact with the board is slewed to the starting point in response to command X and Y voltages. A coincidence circuit also responds to the command X and Y voltages and the position of the pen to develop error voltages. The X and Y error voltages are each rectified and applied to an "or" circuit with the larger error voltage being applied to a bistable circuit. After the pen is moved to the command position and the resulting inertial overshoot motions terminate, the X and Y error voltages both decrease below a selected minimum value for a predetermined minimum time, and the bistable circuit is triggered to the pen down condition. A "pen down" signal is then applied from the bistable circuit to the pen mechanism for lowering the pen onto the plotting board, Thus, the control circuit in accordance with the invention provides rapid slewing of the pen to a command position and reliably lowers the pen onto the board only when pen movements have terminated.

The novel features of this invention, both as to its organization and method of operation, will best be understood from the accompanying description, taken in connection with the accompanying drawings, in which like reference characters refer to like parts, and in which.

Figure 1:
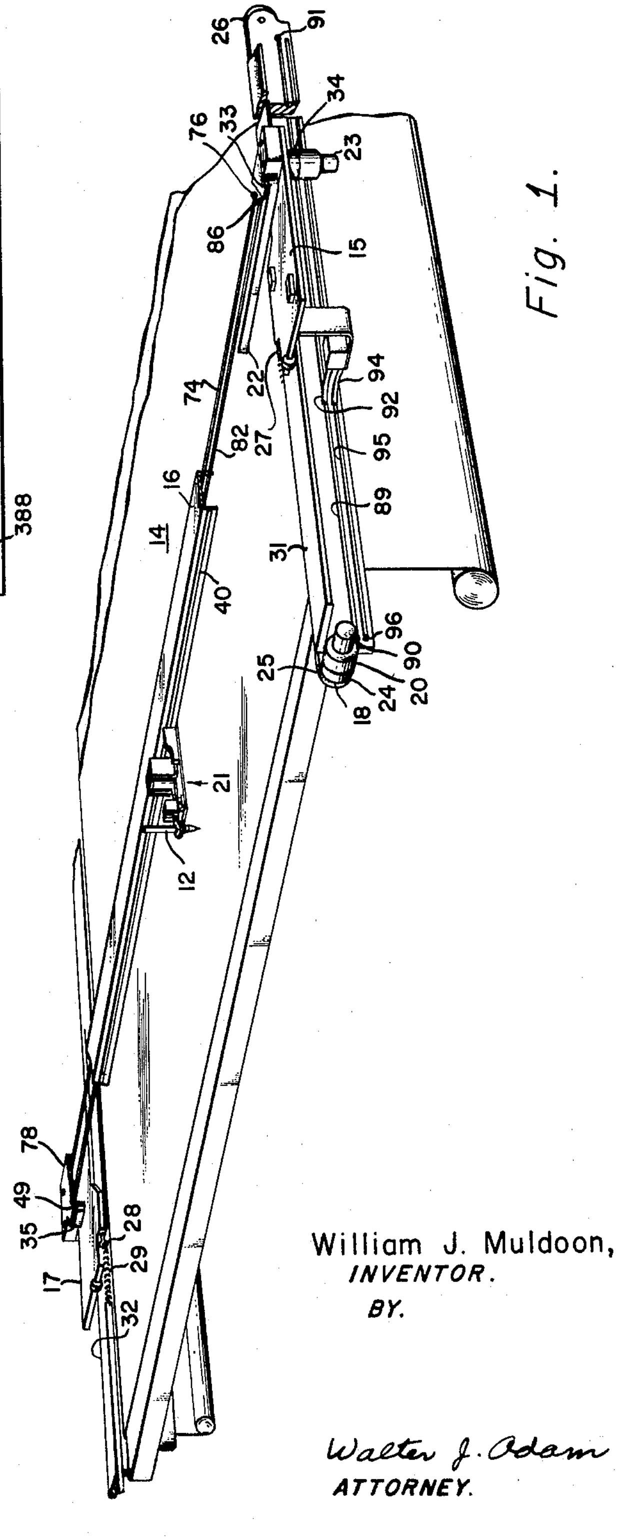
FIG. 1 is a perspective plan view of the plotting board and mechanism which may be utilized in the system in accordance with this invention.

Referring first to the perspective drawing of FIG. 1, the pen control circuit in accordance with the invention (FIGS. 4 and 5) responds to a pair of command signals to rapidly slew or move a pen 12 from any position to a new position on a plotting board 14. An arm 16 attached to movable structures 15 and 17 moves with a belt 18 in response to a motor 20 and the pen 12 held by structure 21 moves with a belt 22 along the arm 16 in response to a motor 23. The motors 20 and 23 may be conventional two phase servo-motors with the shaft of the motor 20 coupled through a suitable gear connection 24 to a pulley 25 on which the belt 18 moves at one end. A similar pulley 26 is mounted at the other end of the belt 18. The structures 15 and 17 for moving the arm 16 are suitably attached to the belt 18 at points such as 27 and 28 through a spring such as 29 shown at the point 28 so as to move with the belt 18. The structures 15 and 17 move freely along respective plates 31 and 32 with a suitable track arrangement (not shown) in response to the motor 20. The belt 22 moves at one end on a pulley 33 coupled through a gear connection 34 to the motor 23 and at the other end on a pulley 35. The pulleys 33 and 35 are mounted with suitable axles on the structures 15 and 17.

The structure 21 is slideably mounted on the arm 16 and fixedly attached to the belt 22 such as at a connection 36 (FIG. 3) to respond to the rotation of the motor 23. Thus, the motor 20 moves the position of the pen 12 in the X direction by moving the arm 16 and the motor 23 moves the pen 12 in the Y direction by moving the pen structure 21 along the arm 16. It is to be noted that the motor 23 is attached to the structure 15 so as to move therewith in the X direction.

Figure 2:
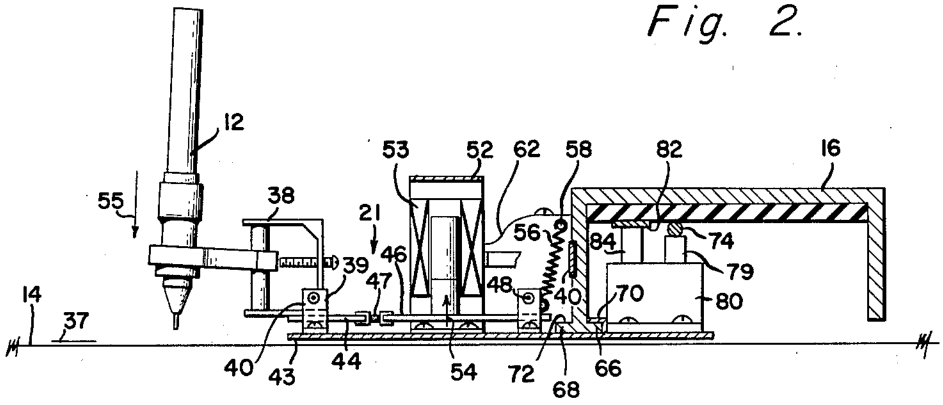
FIG. 2 is an elevation view partly in cross section of the pen structure of FIG. 1 showing the details of the pen control mechanism.
Figure 3:
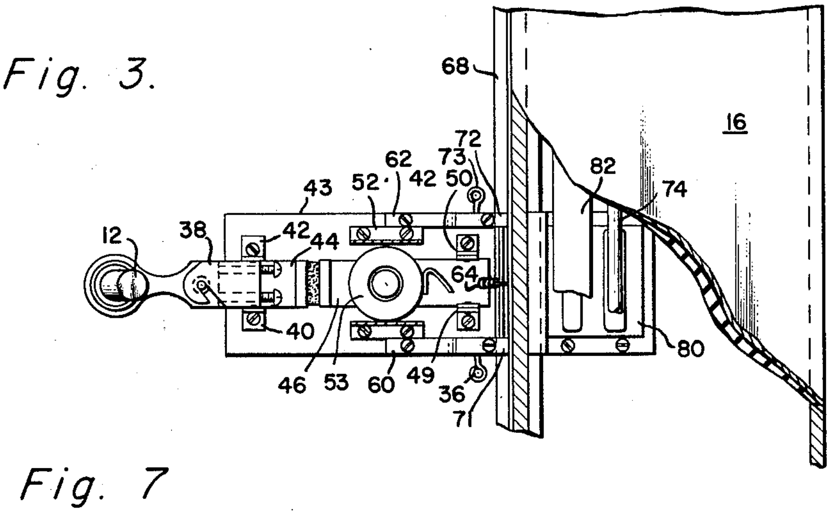
FIG. 3 is a partially broken away plan view of the arm 16 and structure 21 of FIG. 1 for further explaining the operation of the pen control mechanism.

The pen 12 which may be seen in the elevational view of FIG. 2 in the "pen up" position is maintained raised from the surface of the plotting board 14 when moving or slewing to a command position. The plotting board 14 may be covered with drawing paper 37, for example. Referring both to FIGS. 2 and 3, the general structure 21 may include a pen holding frame 38 movable up and down around the axis of a pin 39 which in turn is attached to flanges 40 and 42 mounted on a plate 43. The frame 38 is in turn fixedly attached to a first movable plate 44 which is flexibly coupled to a second movable plate 46 by a properly shaped flexible connection 47. The second plate 46 is movable around the axis of a pin 48 attached to the plate 43 by flanges 49 and 50. A solenoid 52 mounted on the plate 43 responds when a coil 53 is energized to move the second plate 46 upward as shown by an arrow 54 which in turn acting through the pin 39 moves the pen 12 down as shown by an arrow 55. A spring 56 which may be of the coil type is attached from a rod 58 which in turn is attached to flanges 60 and 62 mounted on the plate 43, to a point 64 on the second plate 46. The spring 56 holds the pen 12 up in the position shown when the solenoid 52 is not energized or moves the pen 12 to the position shown when the solenoid 52 is deenergized. The plate 43 and the structure attached thereto move along the arm 16 on flanges 66 and 68. A sliding structure 70 is positioned around the flange 66. Notches such as 72 of the flange 62 slideably contact the flange 68 to support the moving plate 43. The flange 60 has a notch 71 similar to the notch 72. The belt 22 is attached to the flanges 60 and 62 by the connection 36 and a connection 73.

For providing an indication of the actual position of the pen 12 in the Y direction, a resistor wire 74 is provided coupled between terminals 76 and 78 (FIG. 1) as will be explained subsequently and is coupled to the movable structure 21 by a wiper arm or sliding contact 79. The wiper arm 79 is attached to the plate 43 through suitable structure 80. A wire or bus bar 82 contacting a wiper arm 84 applies the sensed signal from the wiper arm 79 to a terminal 86. A bus bar 40 is provided on the arm 16 coupled to a terminal 49 and contacted by a wiper arm 51 so as to apply an end of line signal to the coil 53. The other end of the coil 53 may be grounded to the arm 16, for example.

The indication of the actual position in the X direction as may be seen in FIG. 1 is provided by a resistor wire 89 mounted between terminals 90 and 91 and contacting a wiper arm 92 mounted on the structure 15. The wiper arm 92 is coupled to a wiper arm 94 which contacts a bus or wire 95 coupled to a terminal 96 to which the sensed position signal is applied.

Figure 4:
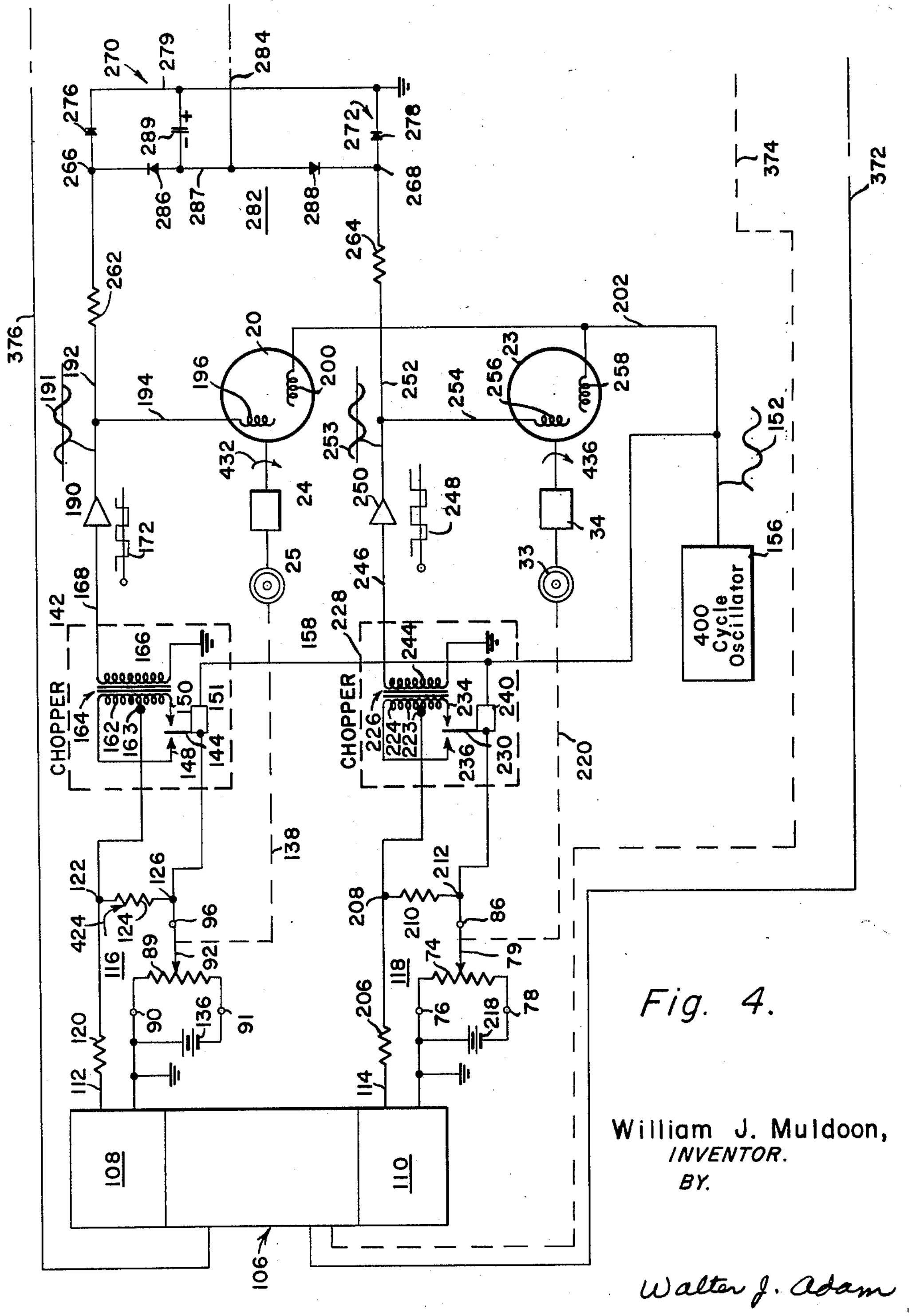
FIG. 4 is a schematic block and circuit diagram of a first portion of the pen control circuit in accordance with this invention.
Figure 5:
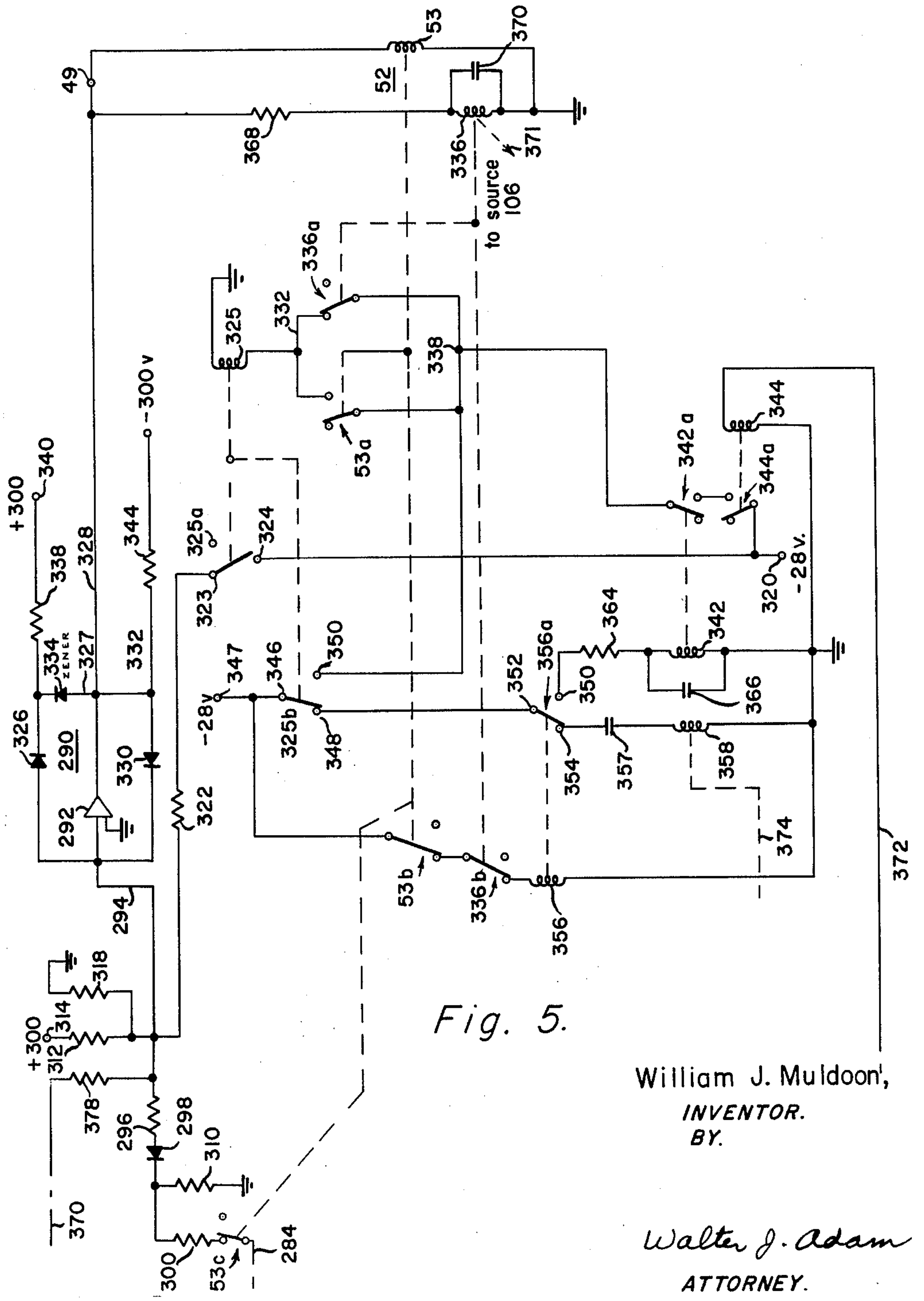
FIG. 5 is a schematic block and circuit diagram of a second portion of the pen control circuit in accordance with this invention.

To control the position of the pen 12 as well as to move the pen 12 onto the plotting board 14 at a proper time, the circuits of FIGS. 4 and 5 include a source of signals 106 which may include function generators 108 and 110 developing respectively X and Y D.C. (direct current) command voltages. The X and Y command voltages may be developed in response to a digital command signal, for example, and are respectively applied through leads 112 and 114 to coincidence circuits 116 and 118. A resistor 120 of the coincidence circuit 116 is coupled between the lead 112 and a junction point 122 which in turn is coupled through a resistor 124 to a junction point 126. The wiper arm 92 also shown in FIG. 1 is coupled to the junction 126 through the terminal 96 which for convenience of illustration includes the arm 94 and the bus bar 95 of FIG. 1. The X position resistor 89 is coupled through the terminals 90 and 91 as also shown in FIG. 1 to a suitable source of potential such as the respective positive and negative terminals of a battery 136. The positive terminal of the battery 136 is coupled to ground. The wiper arm 92 moves along the resistor 89 in response to the rotation of the motor 20 moving the structures 15 and 17 and the arm 16 in the X direction. This movement of the wiper arm 92 in response to the motor 20 of FIG. 1 is indicated by a mechanical connection 138 coupled from the gear box 24 through the pulley 25 to the arm 92.

The D.C. command voltage applied to the lead 112 causes current to flow in series through the resistors 120 and 124, through the arm 92 and through a portion of the resistor 89 to the positive terminal of the battery 136, the direction of current flow depending on the relative values of the command voltage at the junction point 126. As the arm 92 moves in a required direction, the actual position voltage at the junction 126 approaches the command voltage on the lead 112. Thus, current flow is decreased through the resistors 120 and 124 and the voltage at the junction 122 decreases to a coincidence or selected difference value, as will be discussed subsequently.

For controlling the two phase motor 20, a chopper circuit 142 is provided which, for example, may be a mechanical chopper having a movable arm 144 connected to the junction point 126 and oscillating between two contacts 148 and 150. A solenoid 151 is energized and deenergized in response to a reference signal of a waveform 152 which is applied thereto from a suitable oscillator 156 through a lead 158. The reference signal of the waveform 152 may have a frequency of 400 cycles per second, for example. The contacts 148 and 150 are coupled to opposite ends of a first winding 162 of a transformer 164 with the winding 162 having a center tap coupled to the junction point 122. The arm 144 is coupled to the junction point 126 to provide a reference voltage for the chopping operation. A second winding 166 is coupled between ground and a lead 168 to which is applied a 400 cycle square wave signal of a waveform 172 having peak amplitudes during a slewing operation representative of the error voltage or differential voltage between the command voltage and the actual position voltage at the junction point 126 and having a phase relative to the reference signal of the waveform 152 representing the commanded direction of motor rotation. The signal of the waveform 172 is applied from the lead 168 through a phase shifting amplifier 190 to be amplified and shifted 90° in phase in a predetermined direction and to be smoothed into substantially a sine wave to form the signal of a waveform 191. The signal of the waveform 191 which may be called an error signal is applied from the amplifier 190 to a lead 192 and in turn to a lead 194 coupled to a first winding 196 of the two phase servo-motor 20. A second winding 200 of the servo-motor 20 is coupled through a lead 202 to the 400 cycle oscillator 156 to respond to the reference signal of the waveform 152. Thus, because of the 90° phase shift in the amplifier 190, the motor 20 turns in response to the error signal of the waveform 191. The shaft of the motor 20 is coupled to the gear box 24 and to the pulley 25 in order to move the arm 16 and the pen 12 in the X direction. As discussed previously, the mechanical connection 138 represents the movement of the arm 16 which in turn moves the wiper arm 92 along the resistor 89.

The circuit for developing an error voltage to control the motor 23 which provides movement of the pen 12 in the Y direction is similar to the arrangement for controlling movement of the pen 12 in the X direction. A Y command signal is applied from the lead 114 through a resistor 206 to a junction point 208 and through a resistor 210 to a junction point 212. The junction point 212 is coupled to the wiper arm 79 through the terminal 86 of FIG. 1, with the wiper arm 79 slideably contacting the resistor 74. The bus bar 82 and arm 84 of FIG. 2 are included in the terminal 86 for convenience of illustration. A suitable source of potential such as a battery 218 has a positive terminal coupled to ground as well as through the terminal 76 (FIG. 1) to a first end of the resistor 74. The negative terminal of the battery 218 is coupled through the terminal 78 to the second end of the resistor 74. The arm 79 moves in response to a mechanical connection 220 which is shown coupled from the motor 23 and gear box 34 representing the movement of the pen 12 along the arm 16 in response to the motor 23. Thus, as the motor 23 turns, the actual position voltage applied to the junction point 212 approaches the command voltage on the lead 114 until a selected differential or coincidence is reached.

The D.C. error voltage at the junction point 208 is applied to a center tap 223 of a winding 224 in turn of a transformer 226 and included in a chopper 228. A movable chopper arm 230 is provided positioned between contacts 234 and 236 which are in turn coupled to opposite ends of the winding 224. A solenoid 240 for moving the arm 230 responds to the reference signal of the waveform 152 through the lead 158. An output winding 244 of the transformer 226 has one end coupled to ground and the other end coupled to a lead 246 to which is applied an A.C. square wave error signal of a waveform 248 referenced to ground potential.

The error signal of the waveform 248 is applied from the lead 246 through a phase shifting amplifier 250 where the square wave is amplified, shifted 90 degrees and smoothed to form an error signal of the waveform 253 which is applied to a lead 252. The error signal of the waveform 253 is applied from the lead 252 through a lead 254 to a first winding 256 of the two phase servomotor 23. A second winding 258 of the motor 23 is responsive to the reference signal of the waveform 152 applied from the lead 202. The shaft of the motor 28 is coupled to the gear box 34 to turn the pulley 33 and in turn move the pen 12 along the arm 16. As discussed above, the mechanical connection 220 represents the movement of the pen in the Y direction and provides a feedback of the actual position voltage to obtain coincidence or a selected voltage difference with the command voltage.

The above described arrangement responding in both the X and Y directions slews or moves the pen 12 to a command position on the board 14 with the pen 12 held in an "up" position. In order to drop the pen 12 onto the plotting board 14 at the proper time, the X and Y error signals of the waveforms 191 and 253 are applied through respective resistors 262 and 264 to respective junctions 266 and 268 which in turn are respectively coupled to half wave rectifier circuits 270 and 272. Diodes 276 and 278 are respectively included in the rectifier circuits 270 and 272. The diode 276 is coupled between the junction 266 and a lead 279 which in turn is coupled to ground and the diode 278 is coupled between the junction point 268 and the lead 279. An "or" gate 282 is provided for applying the largest error voltage at either the junctions 266 and 268 to a lead 284 and includes a diode 286 having a cathode to anode path coupled between the junction 266 and a lead 287 in turn coupled to the lead 284 and a diode 288 having a cathode to anode path coupled between the junction 268 and the lead 287. A time constant as well as a detecting action in conjunction with the diodes 276 and 278 is provided by a capacitor 289 coupled between the leads 279 and 287. The rectified error voltages at the junction points 266 and 268 are negative relative to the voltage on the lead 287 so that the most negative error value is applied to the lead 287 through either the diode 286 or the diode 288.

In order to move the pen 12 down onto the plotting board 14 when the error voltage applied to the lead 284 decreases to a selected value, a bistable amplifier circuit 290 is provided as shown in FIG. 5 including an inverting amplifier 292 coupled through a lead 294 and a series coupled resistor 296, the anode to cathode path of a diode 298 and a resistor 300 to the lead 284. A resistor 310 is coupled from between the resistor 300 and the cathode of the diode 298 to ground. The lead 294 is coupled through a resistor 312 to a +300 volt positive source of potential such as a thermal 314 and through a resistor 318 to ground. The lead 294 is also coupled to a —28 volt negative source of potential 320 through a resistor 322 and terminals 323 and 324 of a relay switch 325*a* which is closed in the de-energized condition. The bistable amplifier 290 includes a diode 326 having an anode to cathode path coupled between the lead 294 and a lead 327 which is in turn coupled through the cathode to anode path of a zener diode 334 to an output lead 328 of the amplifier circuit 290. A second diode 330 has a cathode to anode path coupled between the lead 294 and a lead 332 which in turn is coupled to the lead 328. The zener diode 334 provides a clamping action when the diode 326 is conducting. The cathode of the diode 326 is coupled through a resistor 338 to a +300 volt source potential such as a thermal 340 and the lead 332 is coupled through a resistor 334 to a —300 volt source of potential such as a terminal 346. The pen down signal (FIG. 8) is applied from the bistable amplifier 290 through the lead 328 through the terminal 49, the wire 40 and contact 51 of FIG. 1 and through the pen relay coil 53 of the solenoid 52 to ground. The signal on the lead 328 is biased positive during the slewing action of the pen 12 but in response to the error signal of the waveforms 191 and 253 both increasing to a selected negative amplitude, is triggered to a state to apply a negative signal to the lead 328 to energize the pen relay coil 53 and move the pen 12 onto the plotting board 14.

To provide starting of the system and other timing control, a relay arrangement is provided including a sum relay coil 325 coupled between ground and a lead 332. The relay coil 325 actuates or opens the relay switch 325*a* when energized. The lead 332 is coupled through a normally closed function generator relay switch 336*a* to a junction point 338. Also, the lead 332 is coupled to the junction point 338 through a normally open pen relay switch 53*a*. It is to be noted that the relay switches in FIG. 5 are shown in the de-energized condition. The junction point 338 is coupled in series through a normally open relay switch 342*a* and a normally open start relay switch 344*a* to the —28 volt terminal 320. A pen relay switch 53*c* is provided in the lead 284 to disconnect the source of motor signals when lines are being drawn.

Also provided is a sum relay switch 325*b* having a terminal 346 coupled to a —28 volt terminal 347 and with an arm normally contacting a terminal 348. When energized, the arm contacts a terminal 350 which in turn is coupled to the junction point 338. The terminal 348 is coupled through terminals 352 and 354 of a relay switch 356*a*, through a capacitor 357 and through an end of line relay coil 358 to ground. A second terminal 360 of the relay switch 356*a* is coupled through a resistor 364 and a relay coil 342 to ground. A capacitor 366 is coupled across the coil 342 so as to provide a time delay. A function generator relay coil 336 is coupled from ground through a resistor 368 to the lead 328. A capacitor 370 is coupled across the coil 336 to provide another time delay. A start relay coil 344 is coupled between ground and a lead 372 through which is applied a start signal (FIG. 7) from the source of signals 106. Also, a normally closed pen relay switch 53*b* and a function generator relay switch 336*b* are coupled in series between the —28 volt terminal 347 and one end of a relay coil 356 having the other end coupled to ground. Thus, the pen relay coil 53 controls the pen relay switches 53*a* and 53*b*, the function generator relay coil 336 controls the function generator relay switches 336*a* and 336*b*, the sum relay coil 325 controls the sum relay switches 325*a* and 325*b* and the relay coil 356 controls the relay switch 356*a*. Also, the relay coil 342 controls the relay switch 342*a* and the start relay coil 344 controls the start relay switch 344*a*. The end of line relay coil 358 applies an end of line control signal to the source of signals 16 through a mechanical connection 374, for example. An end of line signal, as will be explained subsequently, is applied from the source of signals 106 through a lead 376 and a resistor 378 to the lead 294. A mechanical connection 371 may connect from the function generator relay coil 336 to the source 106 to indicate completion of a slewing operation.

Figure 6:
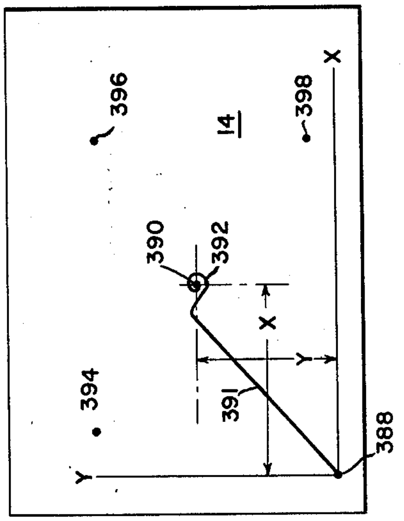
FIG. 6 is a plan view of the plotting board of FIG. 1 for explaining the paths that the pen may move in response to command signals.

Before further explaining the operation of the circuit of FIGS. 4 and 5, the plotting board of FIG. 6 shows the possible direction of movement of the pen 12 during slewing to a command position. A point 388 may be the zero X and zero Y reference point, that is, the point at which the pen 12 would remain or to which the pen would move when zero command voltages are applied to the lead 112 and 114. A point 390 is an example of a command X and Y position to which the pen 12 may move from any point such as from the zero point 388. As the pen 12 moves at a relatively high speed along a path 391 toward the point 390 in a pen "up" position, it may exceed the Y component first because of the weight or of the arm 16 and oscillate to the point 390. The pen 12 due to the inertia or momentum thereof may then oscillate through or around the point 390 passing through the command X and Y values several times as shown by an oscillatory path 392. The oscillatory path 392 may have the shape of a spiral or other shapes as will be discussed subsequently. The operation of the "or" gate 282 and the bistable amplifier 290 as well as the time delay provided by the capacitor 289 in the pen "down" circuit prevents the pen 12 from moving down onto the board 14 until the inertial movement has effectively ended.

The pen 12 moves from any position on the plotting board 14 to any command position by comparing the polarity of the actual position voltage such as at the junction point 126 with the command voltage on the lead 112. For movement of the pen 12 from the point 388 to the point 390, the command voltages on the leads 112 and 114 are positive relative to the position voltages at the respective junctions 126 and 212. From a starting point 394, the pen 12 moves to a command point such as the point 390 when the X position voltage at the junction 126 is negative and the Y position voltage at the junction 212 is positive relative to the respective X and Y command voltages. The pen 12 moves from a starting point 396 to the point 390 when the X and Y position voltages are both positive relative to the respective X and Y command voltages. Also, the pen 12 moves from a position 398 to a pen down point such as 390 when the X position voltage is positive and the Y position voltage is negative relative to the respective X and Y command voltages.

Figure 7:
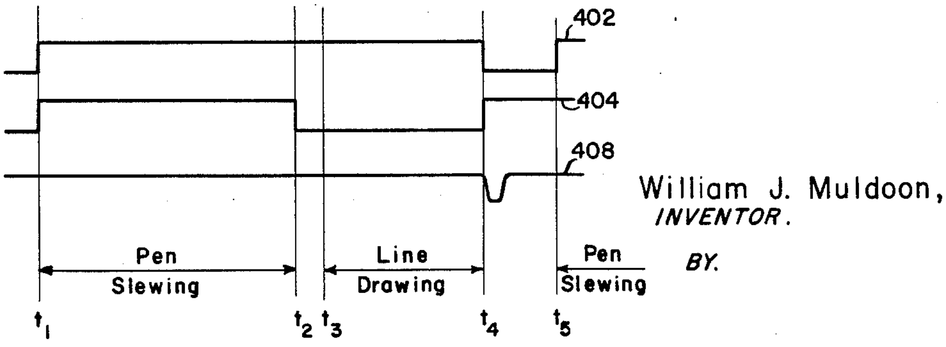
FIG. 7 is a diagram of voltage versus time showing waveforms for explaining a sequence of operation of the pen control circuit in a drafting machine.

Thus, the pen control circuit in accordance with this invention operates to move or slew the pen 12 to a command position when the pen is in the "up" condition and to then move the pen to the "down" condition at the proper time. To explain the cycle of operation of the circuit in accordance with the invention in a drafting machine system, for example, the waveforms of FIG. 7 show pen slewing between times $t_1$ and $t_2$, a delay between times $t_2$ and $t_3$, the drawing of a line by other circuits or arrangements not shown between times $t_3$ and $t_4$ and a delay between times $t_4$ and $t_5$ at which time a new pen slewing operation may be initiated. In this overall timing cycle relative to the relay arrangement of FIG. 5 a start signal of a waveform 402 is applied at time $t_1$ through the lead 372 from the source of control signals 106 to the start relay coil 344 energizing and closing the start relay switch 344*a*. Because at time $t_1$, the relay coil 356 is energized and in turn the relay coil 342 is energized, the switch 342*a* is closed. Thus, the sum relay coil 325 is energized and the sum relay switch 325*b* closes to the terminal 350 to lock itself in the energized condition. Also, the sum relay switch 325*a* opens to remove the −28 volts from the lead 294 which as will be explained subsequently allows the amplifier 290 to respond to the error voltages. Because the sum relay switch 325*b* moves to the energized condition, the relay coil 342 is then de-energized and the relay switch 342*a* opens to the position shown. Thus, the start signal of the waveform 402 can no longer control the circuit during this cycle of operation. Also, approximately at time $t_1$ the pen 12 moves to the "up" position in response to the pen control signal of a waveform 404 on the lead 328 and the slewing operation is started in response to D.C. command voltages applied from the function generators 108 and 110 to respective leads 112 and 114. Thus, between times $t_1$ and $t_2$, the X and Y servo-motors 20 and 23 turn until the voltage at the lead 294 rises to a predetermined value and the pen down amplifier 290 changes state at time $t_2$ to apply a negative signal of the waveform 404, which may be −28 volts, to the lead 328.

At time $t_2$ the pen relay coil 53 is energized and the pen 12 is moved to the "down" condition. Also, the pen relay switch 53*a* is closed to establish an alternate path to the sum relay coil 325. The sum relay switch 53*b* also opens and the relay coil 356 is de-energized. The relay switch 356*a* moves to the normal de-energized condition. Also at time $t_2$, the pen relay switch 53*c* is opened to disconnect any signals from the motors so that the pen 12 is held in the down position during the line drawing operation.

Because of the pen down signal of the waveform 404 on the lead 328, the function generator relay coil 336 is energized at time $t_3$ after a time delay determined by the values of the resistor 368 and the capacitor 370. The function generator relay switch 336*a* is opened so that only one current path remains to the sum relay coil 325. Also at time $t_3$ the switch 336*b* is opened and a signal is applied through the connection 371 to the source 106. As the function generator coil 336 is energized at time $t_3$, other circuits or arrangements (not shown) may be triggered into operation in response to a movement of the connection 371 to apply signals to the pen 12 such as on the leads 112 and 114 to draw a desired line or lines. Thus, line drawing in a system utilizing the pen control circuit in accordance with this invention may occur between times $t_3$ and $t_4$.

At time $t_4$, the source 106 applies an end of line signal of a waveform 408 which is a negative pulse through the lead 376 to the lead 294. The negative signal applied to the lead 294 is inverted in the amplifier 292 to form a positive signal on the lead 328 to cause the diode 334 to conduct. Thus, the pen amplifier 290 momentarily turns off as shown by the signal of the waveform 404 to de-energize the pen relay coil 53. Therefore, approximately at time $t_4$, the pen 12 moves to the "up" position and the pen relay switch 53*a* opens to de-energize the sum relay coil 325. The relay locking switch 325*a* closes and the −28 volts locks the pen amplifier 290 in the pen up condition. Also, shortly after time $t_4$, the sum relay switch 325*b* changes position to contact the terminal 348. Thus, the end of the line relay coil 358 is momentarily energized as the capacitor 356 charges to apply a control signal or movement to the source of signals 106 such as through the connection 374. This signal may be utilized to terminate the start signal of the waveform 402. Also at time $t_4$, the pen down relay switch 53*c* is closed so that pen slewing may be again performed.

Because the pen down signal of the waveform 404 rises at time $t_4$, the function generator relay coil 336 is also de-energized. The function generator relay switches 336*a* and 336*b* move to the de-energized conditions. The relay coil 356 is energized and the relay switch 356*a* is moved to the terminal 350. After a time delay, the start signal of the waveform 402 is applied to the start relay coil 344 to close the switch 344*a* approximately at time $t_5$, the relay coil 342 is energized, the switch 342*a* closes, and the sum relay coil 325 is energized to remove the −28 volts from the lead 294 as shown by the waveform 404 so that the pen relay coil 53 is again responsive to the error signals. This changing of relays completes the cycle of operation and if desired, the pen 12 will again slew to a new command position. It is to be understood that the above described cycle of pen slewing and line drawing is only an example of a sequence in which the pen control circuit in accordance with the invention may be utilized.

Figure 8:
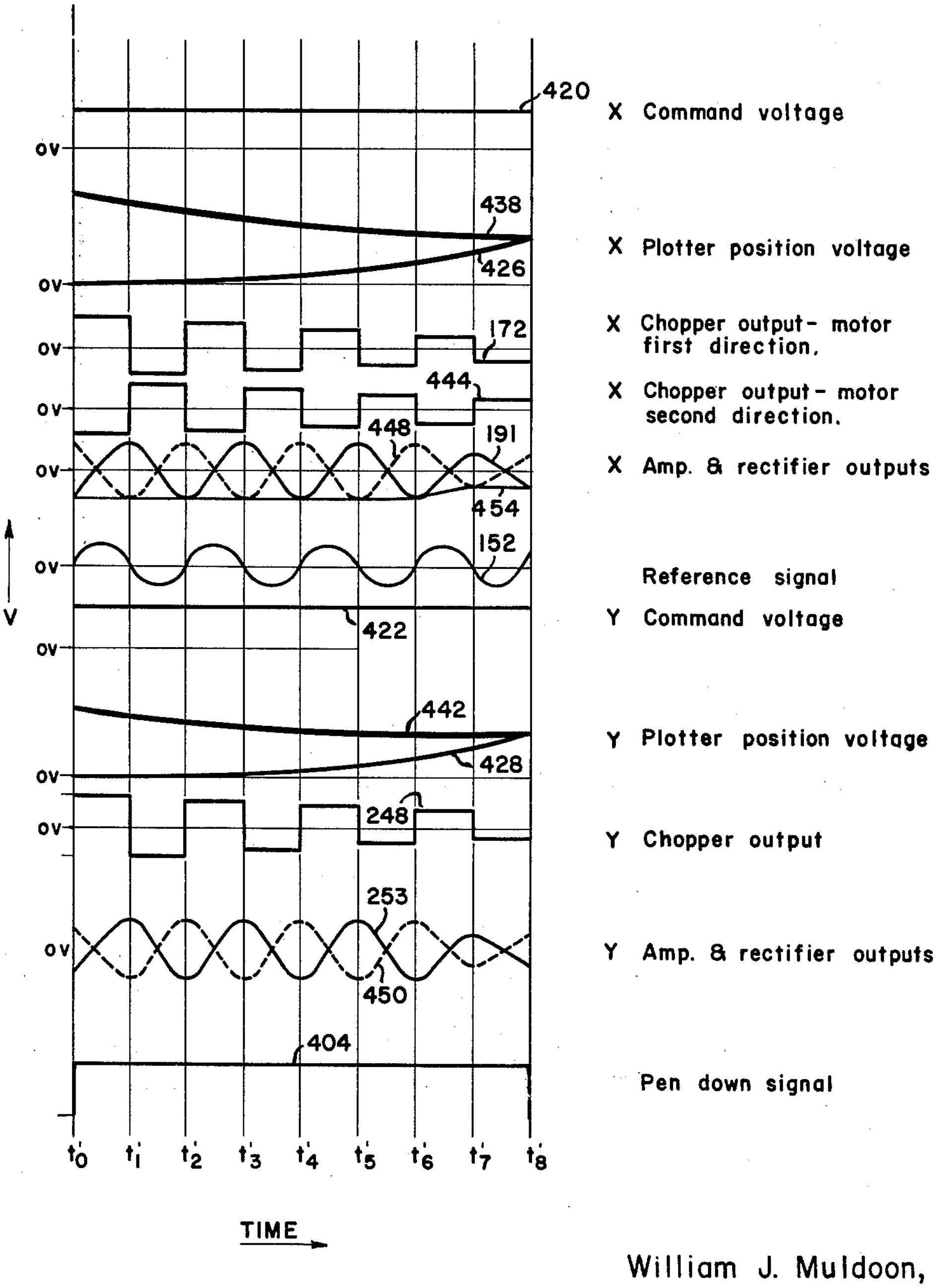
FIG. 8 is a diagram of voltage versus time showing waveforms for further explaining the operation of the pen control circuit of FIGS. 4 and 5.

Now that a general sequence of operation has been described, reference will be made to the waveforms of FIG. 8 as well as to FIGS. 4 and 5 for explaining the operation of the circuit in accordance with the invention during the pen slewing time period. The X and Y command voltages applied to the leads 112 and 114 are shown as the respective waveforms 420 and 422 being positive relative to the zero volt level which may represent the voltages to position the pen 12 at the point 388 of FIG. 6. The D.C. voltage amplitudes of the waveforms 420 and 422 represent the coordinates of the selected pen "down" position such as the point 390. It is to be noted that the times $t_0'$ and $t_8'$ respectively coincide with times $t_1$ and $t_2$ of FIG. 7 so that the pen slewing operation is shown in greater detail between the times $t_1$ to $t_2$. In response to the X command voltage of the waveform 420, current flows in a direction indicated by an arrow 424 through the wiper arm 92 and a portion of the position resistor 89 to ground when the actual position of the pen 12 shown by a waveform 426 is negative relative to the command voltage of the waveform 420. It is to be noted that the arm 92 when in a position at the upper portion of the resistor 89 senses a more positive voltage than when in a lower position. The X position voltage of the waveform 426 and the Y position voltage of a waveform 428 have values such that the pen 12 is at the point 388 at the time $t_0'$ and the command voltages of the waveforms 420 and 422 are the command voltage values for the point 390.

As the command voltages such as the voltage of the waveform 420 is applied to the junction point 122 and to the centertap 163 of the winding 162, the actual position voltage of the wiper arm 92 is applied to the movable arm 144 of the chopper 142. In response to the alternations of the arm 144 as controlled by the reference signal of the waveform 152, current flows first in the winding 162 from the tap 163 to the contact 148 when the arm 144 is in the contact 148 position and then between the center tap 163 and the contact 150 when the arm 144 is in the contact 150 position. Thus, the square wave of the waveform 172 is applied to the lead 168 and is phase shifted 90 degrees and smoothed in the amplifier 190 to be applied to the lead 192 as the error voltage of the waveform 191. It is to be noted that the amplifier 190 saturates so that the signal of the waveform 191 has a relatively constant amplitude for a number of cycles. Because of the 90 degree phase shift relative to the reference voltage of the waveform 152, the motor 20 then turns in a direction determined by the phase relation. In response to the signal of the waveform 191, the motor 20 may turn in a first direction indicated by an arrow 432 to move the arm 16 to the right on FIG. 1 and to move the wiper arm 92 upward along the resistor 89, also shown in FIG. 4. Thus, the voltage differential between the waveforms 420 and 426 decreases between times $t_0'$ and $t_8'$ with the amplitude of the square wave of the waveform 172 decreasing. Because the amplifier 190 is saturated, the signal of the waveform 191 may only decrease in amplitude between times such as $t_6'$ and $t_8'$.

The motor 20 may have a predetermined rest voltage which may, for example, be when the peak amplitude of the waveform 191 is +10 volts relative to a peak amplitude of the waveform 152 which may be 120 volts. This +10 volt peak amplitude of the waveform 191 or rest voltage is thus the value at which the X command motor 20 stops rotating. The total rotation of the motor 20 is the X coordinate contribution for movement of the pen 12 to the point 390. Thus, the coincidence circuit 116 may allow the motor 20 to turn until a predetermined voltage difference between the command voltage of the waveform 420 and the position voltage of the waveform 426 is reached which may be the 10 volts divided by the gain of the amplifier 190.

In a similar manner, the chopper 228 responds to the Y command voltage of the waveform 422 relative to the Y position voltage of the waveform 428 to develop a square wave of the waveform 248 which is phase shifted 90 degrees in the amplifier 250 to be applied as the signal of the waveform 253 to the lead 252. The shaft of the Y command motor 23 then turns in a first direction indicated by an arrow 436 to move the arm 79 upward until the amplitude of the waveform 253 decreases to a measured rest value of the servo-motor 23 as discussed above relative to the motor 20, and the rotation is stopped. It is to be noted that the rest voltages of the motors 20 and 23 are substantially the same for similar type motors. Similar to the motor 20 the direction of rotation of the motor 23 is determined by the phase relation between the signal of the waveform 253 and the reference signal of the waveform 152. Thus, in coincidence or partial coincidence with the movement of the arm 16 in the X direction, the pen 16 moves along the arm 16 to the position of the point 390 although having overshoots such as along the Y axis of the point 390 and around the point 390 or through the point 390. It is to be noted that depending on the direction of movement and the relative loads on the motors 20 and 23, one or the other motor may be energized a longer time with both being stopped at a time such as $t_8'$.

When the starting position of the pen 12 is at the point 396 with the slider arms 92 and 79 in corresponding positions and the command voltages of the waveforms 420 and 422 having values to select the point 390, both motors 20 and 23 turn in opposite directions. The X position voltage at the arm 92 of a waveform 438 has a value positive relative to the command voltage of the waveform 420 and the Y position voltage at the arm 79 of a waveform 442 has a positive value relative to the command voltage of the waveform 422. Current flows in the resistors 120 and 124, for example, in a direction opposite to the arrow 424 and the arm 92 moves downward as the motor 20 rotates toward coincidence or a selected difference voltage at the junction point 126 with the command voltage of the waveform 420. When the arm 144 of the chopper 142 is at the position of the contact 148, current flows from the arm 144 through half of the winding 162 to the center tap 163. Also, when the arm 144 is in the position at the contact 150, current flows from the arm 144 to the center tap 163. Thus, current alternately flows in each half of the winding 162 and in directions opposite to the previously discussed condition when the positive voltage is negative relative to the command voltage. Therefore, the chopper 142 applies a square wave of a waveform 444 to the lead 168 at the same frequency as the reference signal of the waveform 152. However, the phase of the signal of the waveform 444 is shifted 180 degrees from the previously discussed signal of the waveform 172 so as to cause the motor 20 to rotate in the opposite direction. In response to the signal of the waveform 444, the phase shifting amplifier 190 applies the signal of a dotted waveform 448 to the lead 192 and to the winding 196 of the motor 20 which rotates in a second direction opposite to the arrow 432. Thus, the arm 16 moves to the left and the wiper arm 92 moves upward along the resistor 89 until the amplitude of the signal of the waveform 448 decreases to a value corresponding to the residual rest voltage of the motor 20 which, for example may be 10 volts. As discussed previously, the signal of the waveform 448 maintains a relatively constant amplitude as the amplifier 190 saturates and only decreases in peak amplitude such as at time $t_6'$ as the amplifier 190 goes out of saturation in response to the amplitude of the signal of the waveform 444 decreasing sufficiently. Thus, at a time which may be time $t_8'$ the motor 20 stops at the residual voltage which concludes the slewing action in conjunction with movement in the Y direction.

In a similar manner when starting at the initial position 396, the chopper 228 develops a signal similar to the waveform 248 except shifted 180 degrees in phase which is applied through the amplifier 250 as the signal of a waveform 450 shown dotted. Thus, the motor 23 turns in a direction opposite to the arrow 436 with the amplifier 250 initially saturating and the motor 23 rotating until the position voltage at the wiper arm 79 coincides with or is at the selected voltage differential from the command voltage. Thus, the motor 23 stops at a time which may be prior to time $t_8'$ and when the motion is completed in the X direction, the pen 12 is positioned at the command point 390 except for the overshoot motion such as shown by the oscillatory path 392 (FIG. 6).

When the pen 12 is at the initial position 394, the operation is similar except the X position voltage as shown by the waveform 426 is negative relative to the command voltage of the waveform 420 and Y position voltage is positive as shown by the waveform 442 relative to the command voltage of the waveform 422. Also, when the pen 12 is initially at the point or position 398, the X position voltage is initially positive as shown by the waveform 438 relative to the X command voltage of the waveform 420 and the Y position voltage is initially negative as shown by the waveform 428 relative to the Y command voltage of the waveform 422. Thus, the pen 12 moves from any initial position to any command position on the plotting board 14.

In the examples shown in FIG. 6, the pen 12 moves the same distance to the pen down point 390. However, when the distance is shorter or longer, the time varies and may be less or more than shown between times $t_0'$ and $t_8'$ or $t_1$ to $t_2$ of FIG. 7. It is to be noted that the function generator relay coil 336 of FIG. 5 is energized at the end of the slewing operation to control the source 106. When the square wave error voltages of the waveforms 172 and 248 are applied to the amplifiers 190 and 250, the amplifiers are saturated and the motors 20 and 23 accelerate in a very short time period to full speed. As discussed above, the amplifiers remain saturated until the pen 16 has moved very close to the command position such as at time $t_6'$. The amplifiers then go out of saturation as the amplitude of the square wave decreases and the motors stop at the command position with the amplitude of the signals of the waveforms such as 191 and 253 decreasing rapidly in the final short distance of pen movement.

After the pen 12 moves to any desired command position, the pen down control which holds the pen up during the slewing operation functions to move the pen onto the plotting board only after pen movement has properly terminated. The signals of the waveforms 191 and 253 which may be considered error voltages are respectively applied to the rectifier diodes 276 and 278 forming half wave rectifiers which in conjunction with the capacitor 289 function as negative amplitude detectors. The positive portion of the waveform 191 is applied through the diode 276 to ground and the negative portion of either the waveforms 191 or 253 is applied through the diode 286 or 288 to maintain a charge on the capacitor 289. The diodes 286 and 288 form the "or" gate 282 which applies the signal having the larger negative amplitude to the lead 287 so that both must be at zero or a selected value below zero before the bistable amplifier 290 is triggered to the pen "down" condition. It is to be noted that the rest voltage of the motors 20 and 23, which may be different from zero volts, determines the voltage on the lead 294 at which the amplifier 290 triggers to the pen "down" condition. Thus, the diodes 276 and 278 and the capacitor 289 form a negative envelope signal such as shown by a waveform 454 on the lead 287 with the "or" gate 282 applying the most negative rectified signal to the capacitor 289. The "or" gate 282 is provided so that when the pen 16 is slewed and passes through the X command value or the Y command value as shown by the paths 391 and 392 so that the error voltage is zero or close to zero, the other command value which is the larger applies the signal to the lead 287 and to the capacitor 289. One motor 20 or 23 may stop rotating before the other with the error signal from the rotating motor being applied through the "or" gate 282.

Another function of the capacitor 289 is to provide a time constant sufficiently great so that the pen is not moved down under certain instantaneous conditions that may occur. The time constant of the capacitor 289 and resistance such as the resistors 300 and 310 is required when the error signal for both the X and Y positions (at junction points 266 and 268) is at the pen down value to trigger the amplifier 290 when the motion of the pen 16 has not properly terminated. For example, if acceleration damping of the motors is present, that is, when the command voltage requires a change of velocity that can not be met by the motor inertia so as to cause the command voltage to cancel the X error voltage at the same time that the signal of the pen passes through the zero Y position, then the time constant of the capacitor 289 prevents the signal on the lead 287 from decreasing to the pen down voltage value. Thus, the bistable amplifier 290 is not erroneously triggered to develop a pen "down" signal. Another condition when the time constant of the capacitor 289 prevents the pen from being moved down erroneously is when the motion in one direction such as the Y direction has settled or stopped and the motion in the X direction passes through the command or zero error position. As shown in FIG. 4, because the load of the X servo-motor 20 moving the arm 16 may be greater than the Y servo-motor 23, the path may coincide with the Y command position first and then oscillate through the X command position. Another condition at which the time constant prevents the pen from moving down improperly is when the pen 12 converges on the command point at an angle so that both the X and Y command voltages are reached simultaneously but the inertia of the pen has not decreased.

In operation, after the amplifier 290 is unlocked at time $t_0'$ as the sum relay switch 325a opens, a negative potential is maintained on the lead 284 in response to the command voltages and the error voltages of the waveforms 191 and 253, for example. Since contacts 53c are closed this negative potential is connected to the input of amplifier 292 through resistor 300, rectifier 298 and resistor 296. Therefore, the diode 330 is maintained biased in conduction and a positive potential is applied through the inverting amplifier 292 to the lead 328 which is the signal of the waveform 404. This positive signal applied to the lead 328 maintains the pen relay coil 53 in a de-energized condition and the pen is held in the up position as described relative to FIGS. 2 and 3. When the error signals at the junction points 266 and 268 both increase to the pen "down" or residual value, as discussed above, is determined by the rest voltage of the servomotors, the time is proper for the pen 12 to move down and a very small signal is applied to the capacitor 289. Thus, when the capacitor 289 discharges through the resistors 300 and 310, for example, for the short time constant provided, the voltage on lead 284 increases, the diode 298 is biased out of conduction and the potential at the lead 294 increases in a positive direction as to the potential at the terminal 314 applied thereto. In response to this positive potential at the lead 294 being applied through the inverting amplifier 292, the diode 330 is biased out of conduction, and the diode 326 is biased into conduction by a rapid regenerative action. The positive signal on the lead 294 is applied through the inverting amplifier 292 as a rapidly decreasing negative signal shown by the waveform 404 effectively clamped at the low voltage by the zener diode 334. Thus, in response to the pen down signal of the waveform 404, current flows from ground through the relay coil 53 and into the amplifier 292 to energize the pen relay coil 53. Because essentially all movements of the pen 12 of FIG. 1 have terminated the pen 12 does not have inertial motions when touching the plotting board 14 which may form undesired lines. Thus, the pen 12 has been positioned and moved down onto the plotting board 14 only when undesired movement such as that resulting from inertia have been terminated. At time $t_8'$ as the pen is in the "down" position, other operations may be performed as discussed relative to FIG. 7. The command voltages of the waveforms 420 and 422 may be terminated at time $t_8'$ and other signals applied to the circuits of FIGS. 4 and 5 or to other circuits for the line drawing operation.

It is to be noted that the principles of this invention for positioning an object and lowering the object at the proper time are not to be limited to the plotting board example shown. Another example in which the principles of the invention may be utilized is in a device for moving a cutting instrument to a desired position for cutting shapes in printed circuitry.

Thus, there has been described a control circuit for rapidly and precisely moving an object such as a pen on a coordinate plotting board to a command position. In response to command signals the pen moves to the desired position while held in an "up" position. When the movements of the pen which may be caused by momentum have terminated, the pen is moved down and may then be utilized to draw a line, for example, by other control mechanism. A time constant is provided in the pen down circuit to prevent the pen from being caused to move "down" by possible conditions such as those resulting from the characteristics of the servo-motors or the path of approach to the command position.

What is claimed is:

1. A circuit responsive to a source of X and Y command signals for moving a pen to a desired position on the surface of an X—Y plotting board when the pen is in an up condition and for moving the pen to a down condition on the surface of the plotting board when intertial movements of the pen have terminated comprising first and second motors mounted on said plotting board for respectively moving said pen in X and Y directions, first and second coincidence means coupled to said source of command signals for respectively responding to the X and Y command signals, said first and second motors respectively coupled to said first and second coincidence means for providing a comparison of the position of said pen with the command position so that said first and second coincidence means respectively develop X and Y direct current error signals, first and second chopping means respectively coupled to said first and second coincidence means and to said first and second motors for responding to said X and Y direct current error signals to apply X and Y alternating error signals thereto, a source of reference potential, first and second rectifier means respectively coupled between said first and second chopper means and said source of reference potential to form X and Y rectified error signals, a capacitor having first and second plates with the first plate coupled to said source of reference potential, first and second diodes respectively coupled between said first and second rectifier means and the second plate of said capacitor, said capacitor being charged by the X and Y rectified error signals having a larger amplitude, bistable amplifier means coupled to the second plate of said capacitor and responsive to the charge thereon to form a first pen control signal when one of the X and Y rectified error signals has an amplitude greater than a predetermined value and a second pen control signal when both of said X and Y rectified error signals have amplitudes less than said predetermined value, and a pen control relay coupled to said bistable amplifier for holding said pen in an up position in response to said first pen control signal and for moving said pen to a down position in response to said second pen control signal.

2. A control circuit for moving a pen to a selected position on the surface of a coordinate plotting board having first and second control motors responding to respectively first and second alternating control voltages applied to windings of said first and second motors, a source of said first and second alternating control voltages responsive to said motors to decrease the amplitudes of said first and second control voltages to a predetermined amplitude when said pen moves to the desired position, said pen being held in a position above the surface of said plotting board when moving to said desired position and being moved to a down position on the surface of said plotting board when at said desired position and movement thereof has terminated comprising a source of reference potential, first and second rectifier diodes respectively coupled between the windings of said first and second control motors and said source of reference potential, a capacitor having a first and a second plate with said first plate coupled to said source of reference potential, third and fourth diodes respectively coupled between said first and second diodes and the second plate of said capacitor, bistable amplifier means coupled to the second plate of said capacitor and responsive to the charge thereon, impedance means coupled between the second plate of said capacitor and said source of reference potential to provide a selected discharge rate to said capacitor, and relay means coupled to said bistable amplifier for holding said pen in the up position when de-energized and for moving said pen to the down position when energized, whereby said first and second control voltages are rectified by said first and second diodes with the rectified voltage having the smaller amplitude being applied to said capacitor to provide a charge thereon and said bistable means responds to a predetermined charge on said capacitor representative of the pen being at the desired position with movements thereof terminated to energize said relay means and move said pen to the down position.

References Cited in the file of this patent

UNITED STATES PATENTS

| | | |
|---|---|---|
| 2,620,256 | Kerns et al. | Dec. 2, 1952 |
| 2,937,913 | Boyle | May 24, 1960 |
| 2,948,580 | Eisenstark | Aug. 9, 1960 |
| 2,975,235 | Leitner et al. | Mar. 14, 1961 |